United States Patent [19]
Hays et al.

[11] Patent Number: 5,777,760
[45] Date of Patent: Jul. 7, 1998

[54] POSITION FEEDBACK SYSTEM FOR VOLUME HOLOGRAPHIC STORAGE MEDIA

[75] Inventors: Nathan J. Hays, San Francisco; James A. Henson, Morgan Hill; Christopher M. Carpenter, Sunnyvale; William R. Akin, Jr., Morgan Hill; Richard M. Ehrlich, Saratoga; Lance D. Beazley, San Jose, all of Calif.

[73] Assignee: Quantum Corporation, Milpitas, Calif.

[21] Appl. No.: 644,810

[22] Filed: May 10, 1996

[51] Int. Cl.⁶ .............. G03H 1/02; G03H 1/28; G11C 13/04; G11B 7/24
[52] U.S. Cl. .............. 359/7; 359/24; 365/125; 369/103
[58] Field of Search .............. 359/24, 22, 21, 359/7, 4, 3, 558; 356/138, 347, 348, 399, 400, 139; 365/124, 125, 216, 234, 235; 369/103, 109

[56] References Cited

U.S. PATENT DOCUMENTS

| | | | |
|---|---|---|---|
| 3,847,465 | 11/1974 | Micheron et al. | 365/125 |
| 3,936,139 | 2/1976 | Huignard et al. | 365/125 |
| 4,034,355 | 7/1977 | Carlsen | 340/173 |
| 4,449,785 | 5/1984 | Huignard et al. | 359/24 |
| 5,110,210 | 5/1992 | Fay et al. | 356/373 |
| 5,206,706 | 4/1993 | Quinn | 356/400 |
| 5,272,550 | 12/1993 | Dickson et al. | 359/3 |
| 5,272,690 | 12/1993 | Bargerhuff | 369/112 |
| 5,319,629 | 6/1994 | Henshaw et al. | 369/103 |
| 5,416,616 | 5/1995 | Jenkins et al. | 369/103 |
| 5,422,873 | 6/1995 | Kewitsch et al. | 365/125 |
| 5,440,669 | 8/1995 | Rackuljic | 359/7 |
| 5,450,218 | 9/1995 | Heanue et al. | 365/125 |
| 5,483,365 | 1/1996 | Pu et al. | 369/103 |

OTHER PUBLICATIONS

Hong et al., "Volume Holographic Memory Systems: Techniques and Architectures", *Optical Engineering*, vol. 34 No. 8, Aug. 1995, pp. 2193–2203.

Heanue et al., "Volume Holographic Storage and Retrieval of Digital Data", *Science*, vol. 265, Aug. 5, 1994, pp. 749–752.

*Primary Examiner*—Jon W. Henry
*Attorney, Agent, or Firm*—John C. Chen; David B. Harrison

[57] ABSTRACT

A method of holographic recording in a photorefractive medium wherein stored holograms may be retrieved with maximum signal-to noise ratio (SNR) is disclosed. A plurality of servo blocks containing position feedback information is recorded in the crystal and made non-erasable by heating the crystal. The servo blocks are recorded at specific increments, either angular or frequency, depending whether wavelength or angular multiplexing is applied, and each servo block is defined by one of five patterns. Data pages are then recorded at positions or wavelengths enabling each data page to be subsequently reconstructed with servo patterns which provide position feedback information. The method of recording data pages and servo blocks is consistent with conventional practices. In addition, the recording system also includes components (e.g. voice coil motor) which respond to position feedback information and adjust the angular position of the reference angle of a reference beam to maximize SNR by reducing crosstalk, thereby improving storage capacity.

24 Claims, 8 Drawing Sheets

POSITION FEEDBACK SYSTEM FOR VOLUME HOLOGRAPHIC STORAGE MEDIA

FIELD OF THE INVENTION

This invention relates to the field of holographic storage systems and methods. More particularly, this invention relates to a method for recording data in and reconstructing data from a photorefractive medium in the form of holograms, including a permanent hologram containing position feedback information.

BACKGROUND OF THE INVENTION

The potential of volume holographic storage in photorefractive medium for large digital storage capacity, fast data transfer rates and short access times has been considered for some time. Recent developments in materials and holographic storage components have made the promise of data storage capacity in the magnitude of terabytes, transfer rates exceeding 1 gigabyte per second and random access times less than 100 micro seconds closer to being realized.

Photorefractive materials have the property of developing light induced changes in their index of refraction. Holographic storage can be accomplished by propagating and recording an image-bearing light beam and a reference beam into a photorefractive medium. The resulting optical interference pattern causes a spatial index of refraction to be modulated throughout the volume of the medium. In a photo-refractive medium such as LiNbO$_3$ (lithium niobate), the spatial index of refraction gratings are generated through the electro-optic effect as a result of an internal electric field generated from migration and trapping of photoexcited electrons. When the medium is illuminated with a beam identical to the reference beam used to generate the refractive index grating, the beam will defract in such a way as to reproduce the original image bearing wavefront.

Figure 1:
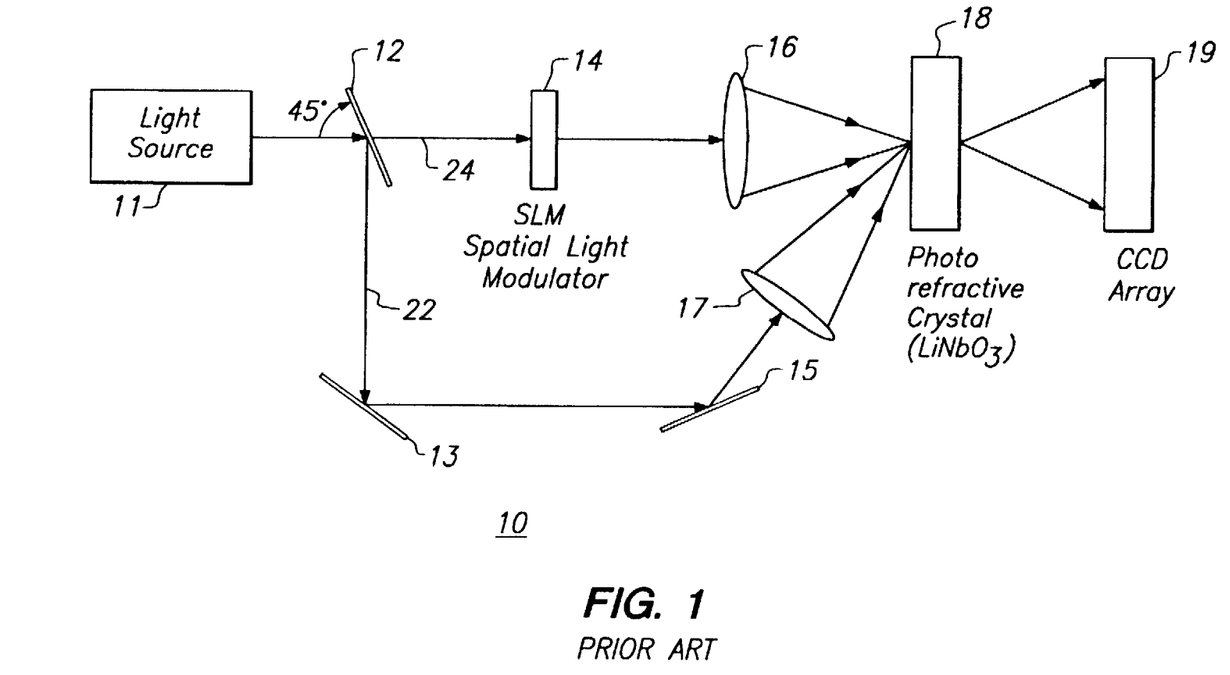
FIG. 1 is a schematic diagram of a typical prior art holographic recording system, using a photorefractive crystal.

In a typical holographic storage system, shown in FIG. 1, a coherent monochromatic beam, projected from a light source 11, may be split into an object beam 24 and a reference beam 22 by a beam splitter 12. The object beam 24 is converted to an optical signal with a Spatial Light Modulator (SLM) 14. Through reducing optics 16 and 17, the object beam 24 and the reference beam 22 converge on and illuminate a photorefractive crystal 18, generating a volumetrically distributed interference pattern in the crystal 18 which is recorded in the form of a refractive index grating, otherwise known as a hologram. The recorded hologram may be reproduced by illuminating the crystal 18 with the identical reference beam 22 and imaging the defracted optical signal onto a detector array 19, which converts the optical signal back into an electrical signal.

Multiple holograms, each corresponding to a data page, may be written and stored in the crystal 18, using various forms of multiplexing, e.g. angular, wavelength, etc. Using angular multiplexing, each hologram is written with a reference beam incident at a different angle. The angles vary depending on the physical geometry and material of the crystal. Typically, angles may differ by a magnitude of about 50 micro radians. The angle may be changed either by mechanically translating the crystal 18 while keeping the object to reference angle constant or by changing the angle of incidence of the reference beam on the crystal by steering the reference beam angle with the reducing optics 16 and 17. With wavelength multiplexing, each hologram is generated with the reference beam fixed at some angle while changing the wavelength of the light source for each data page.

One limitation inhibiting the potential advantages of holographic recording is the metastable (impermanent) nature of recorded holograms. When holograms are serially but coextensively recorded in the same volume of crystal, commonly referred to as "a stack" of recordings, subsequently recorded holograms tend to non-uniformly reduce the diffraction efficiency of previously written holograms. Thus, a "write" process destroys the previously recorded nearby holograms by fractionally reducing the previously recorded hologram's intensity over many write cycles. Similarly, a "read" process of exposing an area to a reference beam illumination will also cause a redistribution of the charges which make up the recorded hologram. This has led to the development of techniques for fixing and developing more permanent holograms. For example, holograms generated by electron charge patterns may be made permanent by heating the crystal, which results in redistributing the ions which cancel the space charge variation in the crystal. The crystal is thereafter cooled, trapping the ions and forming a permanent ionic grating to generate the index variation.

Another limitation inhibiting the potential application of holographic recording is cross talk during hologram retrieval, which limits the information density and storage capacity of a crystal. Because of the Bragg-selective nature of a readout, a stored image or data page may be reproduced independently from other pages of the stack of recordings. As discussed, retrieval is accomplished by illuminating the medium with a reference wavelength identical to the one used in recording that image. However, although Bragg-selectivity ensures that an image associated with a particular reference wavelength is reconstructed with the highest efficiency, other stored images may also be reconstructed with less efficiency and distortions due to Bragg-mismatch. To avoid this form of crosstalk, the angular or wavelength separation between holograms must precisely correspond to the zeros of the sinc function associated with the Bragg matching condition. Any deviation from the ideal angle degrades the signal-to-noise ratio (SNR). The consequence is that either the maximum resolution of the image or the storage capacity of the system is reduced.

Many approaches have attempted to overcome this capacity limitation. However, none have utilized a closed loop position feedback system during data page retrieval to maximize SNR of the recorded signal by reducing crosstalk and precise angle positioning. Further, none have utilized a closed loop position feedback system combining permanent and metastable holograms within the same recording area. Thus, a hitherto unsolved need has remained for a method of holographic recording in a photorefractive medium which provides a position feedback system for maximizing SNR of the recorded signal by reducing crosstalk and is applicable to both angular and wavelength multiplexing.

SUMMARY OF THE INVENTION WITH OBJECTS

A general object of the present invention is to provide a method of holographic recording in a photorefractive medium which overcomes limitations and drawbacks of the prior art.

Specifically, an object of the present invention is to provide a method of holographic recording in a photorefractive medium having a position feedback system which maximizes SNR of the recorded signal by reducing crosstalk.

Another object of the present invention is to provide a method of holographic recording in a photorefractive medium wherein the position feedback system is applicable for both angular and wavelength multiplexing.

One more object of the present invention is to provide a method of holographic recording in a photorefractive medium having a position feedback system by combining permanent and metastable holograms.

In accordance with principles of the present invention, a holographic recording method first records a plurality of servo blocks in a photorefractive medium, such as an $LiNbO_3$ crystal. Each servo block is defined by a five spot pattern. The servo blocks are generated by the simultaneous illumination of the crystal by an object and a reference beam on a same area of the crystal. The angle of incidence on a face of the crystal, by the reference beam, defines a reference angle. The servo blocks provide position feedback during reconstruction of data pages stored in the crystal, enabling data pages to be reconstructed with maximum SNR. The servo blocks are further recorded at reference angle increments of half the minimum angular separation of the crystal, which is determined by the physical dimensions of the crystal. The servo blocks are then made non-erasable (fixed) using methods known by those skilled in the art, e.g. by heating the crystal. Each of the five spots is recorded in the same image space as data pages so that position feedback information is retrieved along with a data page during hologram retrieval.

Data pages are then recorded in the same image space of the crystal in the same manner, i.e. by simultaneously illuminating the crystal with an image bearing object beam and a reference beam. The data pages are recorded at reference angle increments of the minimum angular spacing of the crystal. During a data page retrieval, position feedback information from the servo blocks is communicated to a reflector positioner, e.g. a voice coil motor. The positioner rotatably adjusts the angular position of a reflecting mirror to fine tune the reference angle of the reference beam thereby maximizing SNR of the recorded signal by reducing crosstalk.

DETAILED DESCRIPTION OF A PREFERRED EMBODIMENT

Figure 2:
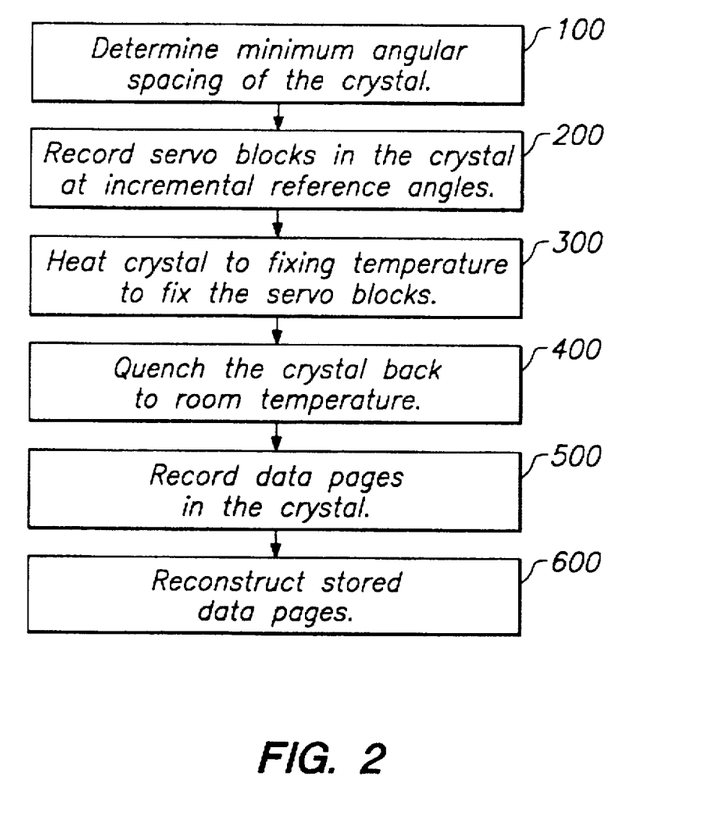
FIG. 2 is a flow diagram of steps for achieving the holographic recording method in accordance with the present invention.

FIG. 2 shows a flow diagram of the steps for achieving the method of holographic recording in accordance with the present invention. These steps include determining minimum angular spacing of the crystal 100, recording servo blocks in the crystal 200, heating the crystal to fix the servo blocks 300, quenching the crystal back to room temperature 400, recording data pages in the crystal 500, and reconstructing recorded data pages 600.

The first step 100, prior to recording any holograms, is determining a minimum angular spacing required to define separate holographic recordings in the photorefractive crystal such that crosstalk is minimized. The details in deriving an equation for determining the minimum angular spacing, are known to those skilled in the art. Specifically, such details are discussed and described in an article by John H. Hong et al. entitled "Volume holographic memory systems: techniques and architectures", *Optical Engineering*, Vol. 34, No. 8, August 1995, the article being incorporated herein by reference. Hong et al. defines the minimum angular spacing $\theta$, by the equation $$\theta = \lambda \cos\theta_o / nL \sin(\theta_r + \theta_o) \tag{1}$$

where $\lambda$=wavelength of the signal, n=refractive index of the crystal, L=thickness of the crystal, $\theta_r$=angle of incidence of the reference beam with respect to the z-axis, and $\theta_o$=angle of incidence of the object beam with respect to the z-axis. $\theta_r$=may be determined based on the geometry of the reducing optics and the crystal. Applying equation (1) to the embodiment illustrated in FIG. 4, where $\theta_o$=0 and $\theta_r$ is approximately 33 degrees, Equation (1) would be reduced to $$\theta = 1.88 \lambda / nL \tag{2}$$

Once the minimum angular spacing is determined, the servo blocks may then be recorded, in the conventional manner, known by those skilled in the art. Servo block s are recorded with a preferred holographic recording system 30, illustrated in FIG. 10. The system 30 includes a signal producing light source 31, a beam splitter 32 which splits a signal 43 into object beam 44 and reference beam 42, a rotatable reflecting mirror 33 having two (2) degrees of freedom for changing the reference angle $\theta_r$, a reflecting mirror 35, an SLM 34 for converting an electrical signal to an optical signal by modulating the object beam 44, reducing lenses 36 and 37, a photorefractive crystal 38 for recording holograms, a detector array 39 and a voice-coil motor (VCM) 41 for rotating reflecting mirror 33 in response to position feedback information detected by array 39. The SLM 34 has an approximately 1.0"×0.8" viewing area, providing an approximately 640×480 pixel area for modulating the object beam. The detector array 39 may be any known in the art e.g. a charge coupled device (CCD) having an approximately 0.5"×0.4" viewing area, providing an approximately 1134×486 pixel area. The crystal 38 is Fe—$LiNb O_3$ and disk shaped, approximately 2 mm thick and 70 mm diameter.

Figure 10:
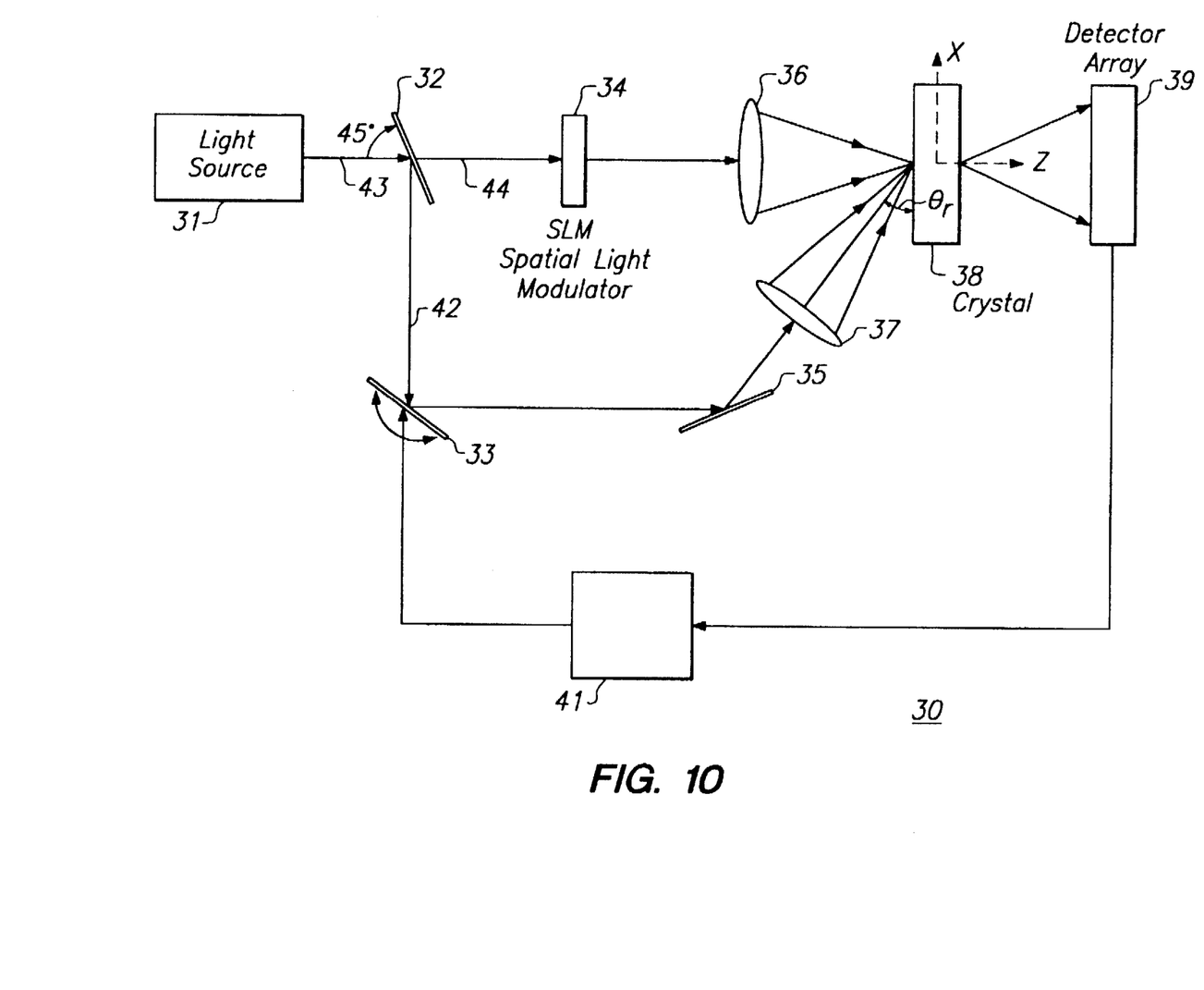
FIG. 10 is a schematic diagram of the holographic recording system for recording and reconstructing holograms in accordance with the present invention.

In accordance with conventional holographic recording practices, each servo pattern is recorded in the crystal 38 by illuminating a servo pattern bearing object beam 44 with a reference beam 42, at a particular reference angle, to form an interference grating in the crystal 38.

Figure 3:
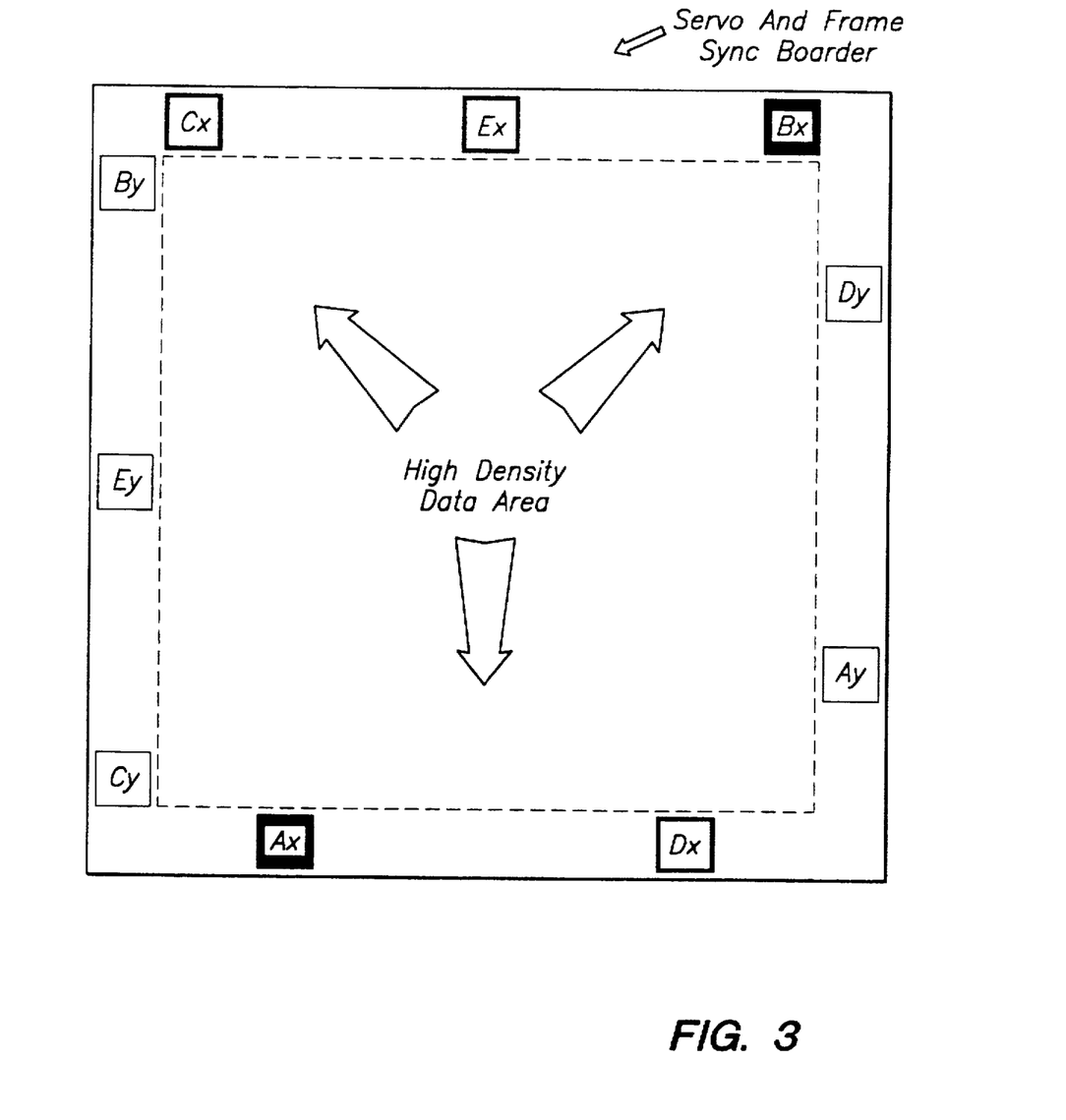
FIG. 3 illustrates one embodiment of a servo block for providing position feedback for the holographic recording method in accordance with principles of the present invention.
Figure 4A:
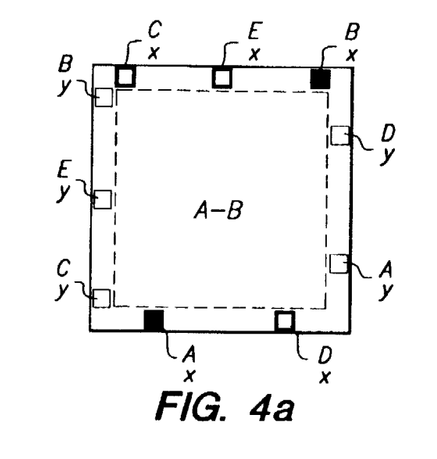
FIGS. 4a–4e illustrate five patterns of the servo block of FIG. 3, in accordance with principles of the present invention.
Figure 4B:
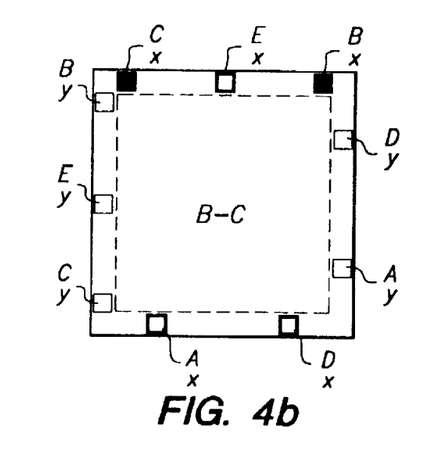
Figure 4C:
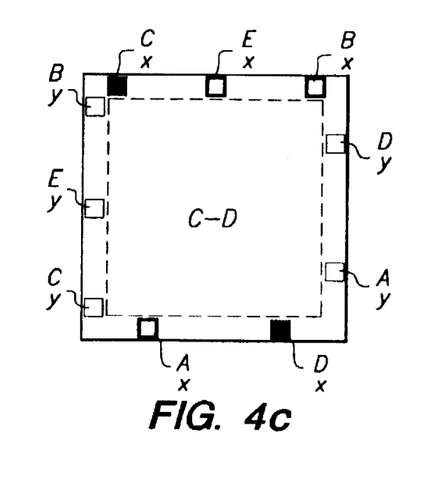
Figure 4D:
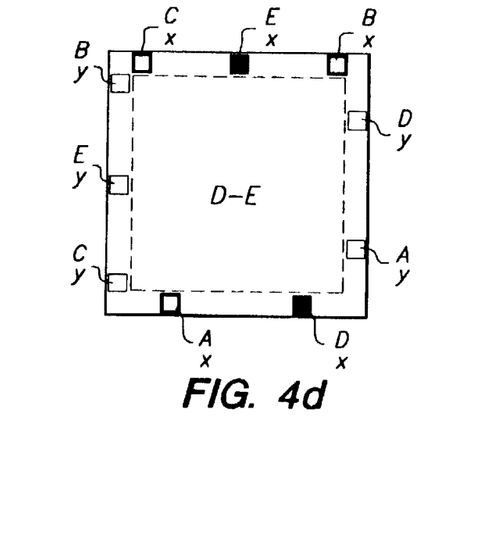
Figure 4E:
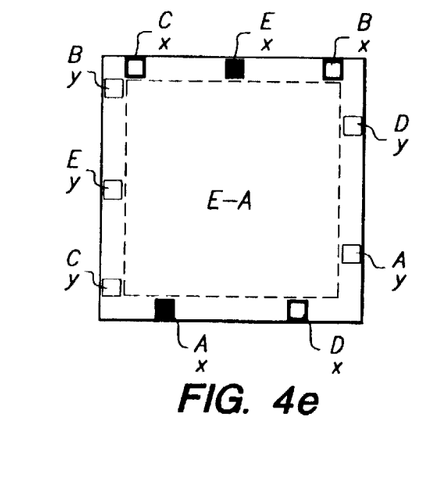

In one preferred embodiment, each servo block is defined by a five spot pattern, shown in FIG. 3. The intensity of each of the five spots A, B, C, D, and E and the combination thereof represent angular positions of the reference beam and provide position feedback information. As depicted in the FIG. 3 embodiment, the five spots are located around the outer periphery of the data area, which is further represented in FIG. 3 as a symmetrical four sided area. In this embodiment, the spots are arranged as shown to maximize the distance between the pairs of spots which define each of the five servo blocks, thereby optimizing the amount of retrievable data area. The servo block of FIG. 3 is shown with the reference beam having one axis of freedom, x-axis, as represented by Ax, Bx, Cx, Dx, and Ex being highlighted. A reference beam indexed in the Y-axis would be represented by Ay, By, Cy, Dy, and Ey being highlighted. Those skilled in the art will understand that other variations of the five patterns may be used, including other arrangements, spot locations, and number of spots.

The servo blocks for one axis of freedom, x-axis, are defined by five patterns, A-B, B-C, C-D, D-E and E-A, as illustrated in FIGS. 4a–4e. Each pattern defines a variation of the five spots. For example, pattern A-B is defined by spots A and B being shaded, pattern B-C defined by spots B and C being shaded, pattern C-D defined by spots C and D being shaded, pattern D-E defined by spots D and E being shaded, and pattern E-A defined by spots E and A being shaded. The shaded spots represent intensified images while the non-shaded spots represent non-intensified images. Each spot is recorded at 0.5θ increments, starting with spot A recorded at −0.75θ, spot B at −0.25θ, and so forth. As will be explained herein below, each of the patterns shown in FIGS. 4a–4e presents feedback information to enable retrieval of each data page with maximum SNR.

Figure 6:
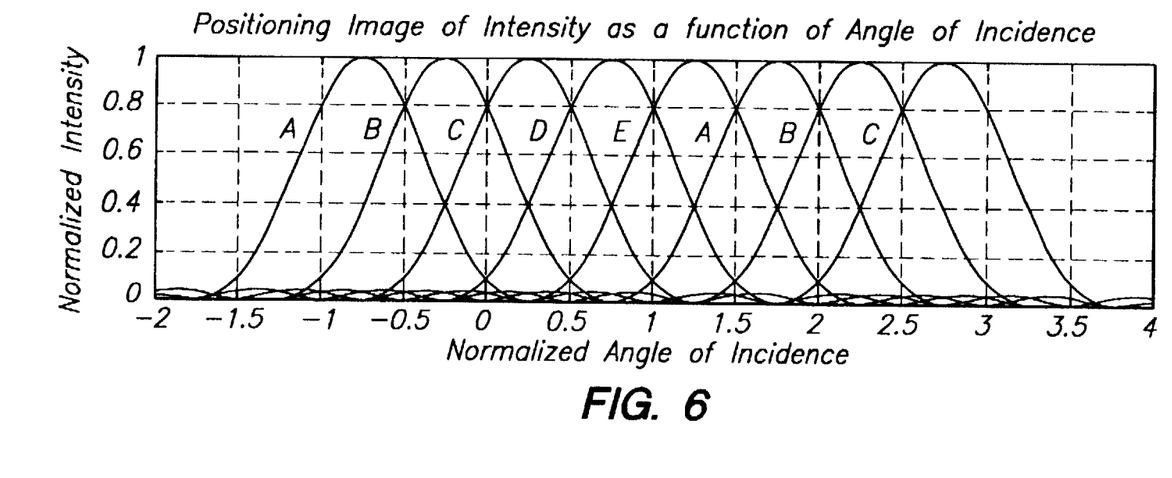
FIG. 6 is a plot of servo block amplitude as a function of angle of incidence of the reference beam.
Figure 9:
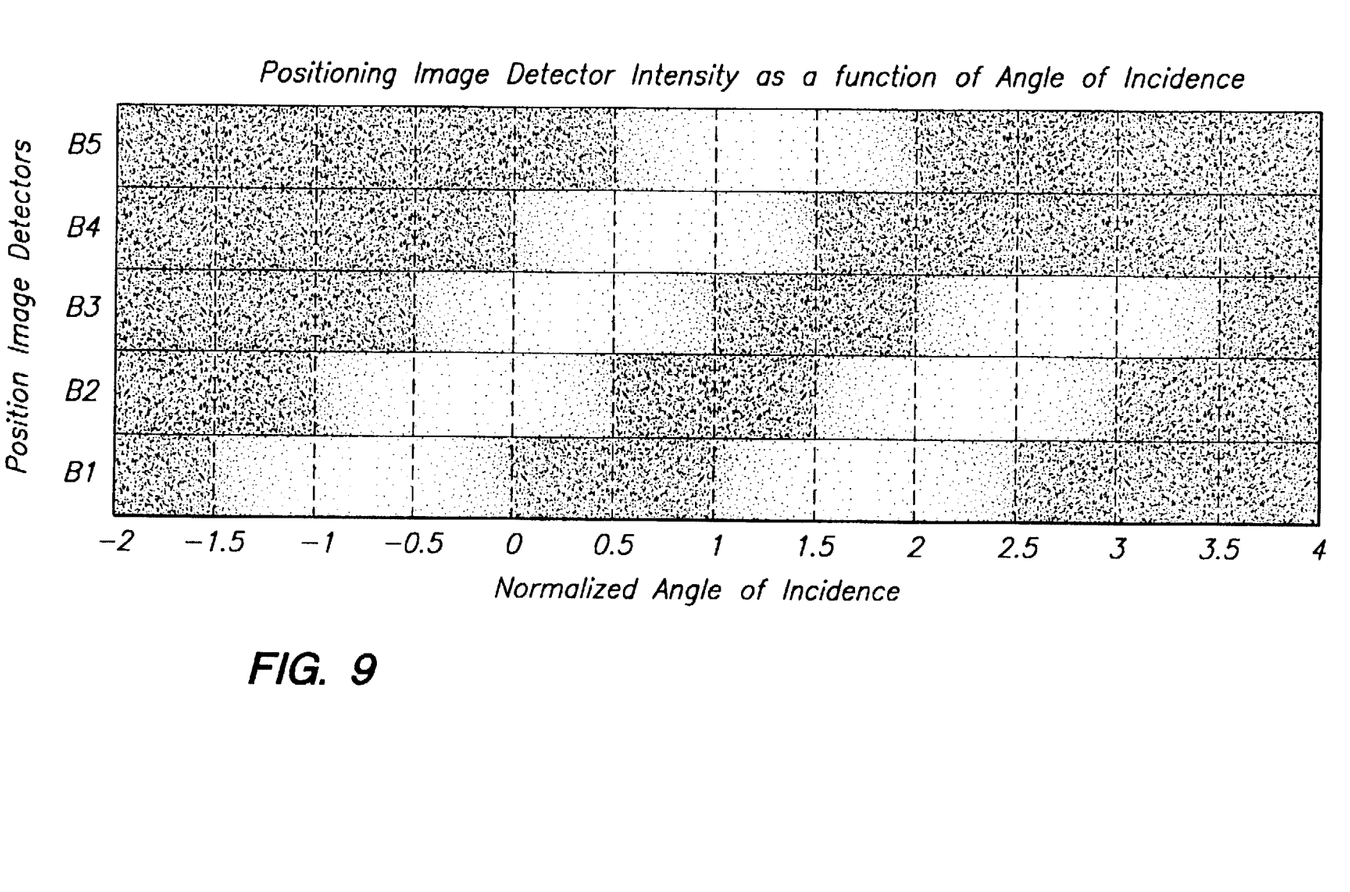
FIG. 9 illustrates servo block sinc image intensities as a function of angle of incidence of the reference beam.

FIG. 6 shows a graphical representation of the image intensity of the five spots (A,B,C,D,E) of a servo block, as a function of angle of incidence, i.e. reference angle, $\theta_r$. Thus, as the reference beam is indexed through a range of angles, the intensity of each of the five spots within each servo block varies, as illustrated in FIG. 9. As illustrated therein, each longitudinal band, B1, B2, etc., corresponds to the intensity of each spot as a function of angle of incidence. In addition, each angle of incidence provides a "snapshot" of the servo block, i.e. the relative intensities of each of the five spots. For example, at the angle of incidence of 0.25θ, the intensity of spot C would be strongest, while spots B and D would exhibit lesser intensified images.

Once the servo blocks are recorded in the crystal, like any other metastable holograms recorded in a photorefractive medium, the servo blocks may be erased over time, by subsequent illuminations. To "fix" the servo blocks, so as not to be erasable by subsequent illumination, the crystal 38 is heated in accordance with conventional methods, represented by step 300. Typically, an Fe—LiNbO$_3$ crystal is heated to approximately 150°–200° C., where the ions become mobile, for a period of time depending on the dimensions of the crystal.

The crystal 38 is then cooled by quickly removing it from the heat source and air cooling it back to ambient temperature (as represented by step 400). The cooling rate is typically dependent on the thermal shock tolerance of the crystal. The process of "fixing" metastable holograms is well known to those skilled in the art. However, the inventors of the present invention believe that a holographic recording method combining permanent and metastable holograms within the same recording areas is not known in the art and is one of the distinguishing features of the present invention.

It should be noted that during servo block writing on the media, a detector array will not be useful as an angle feedback mechanism, since the media lacks any reference encoding. Analogous to disk drive servo writing, a high accuracy measurement system may be used to determine the angle θ, either by an encoder on the beam steering device or by observing both object and reference beams in some other way.

Those skilled in the art will understand that in addition to servo blocks, image space identifiers may be recorded within each image space to provide additional position feedback information. Each identifier may be unique, enabling each image space to be distinguished from others. Identifiers may be recorded simultaneously with the servo blocks or data pages using techniques described herein above with respect to the servo blocks. In addition, identifiers may also be fixed using the conventional method, also described herein above.

Figure 5:
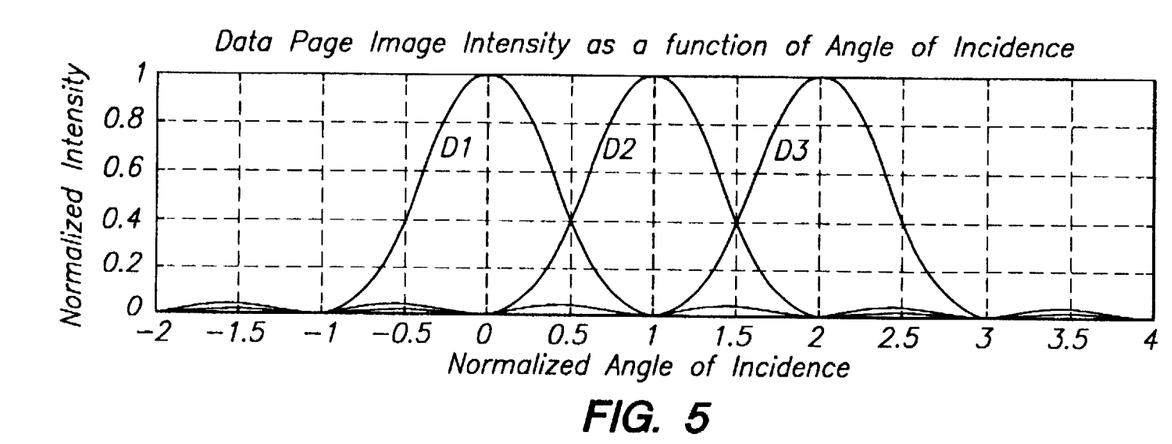
FIG. 5 is a plot of data page amplitude as a function of angle of incidence of the reference beam.
Figure 7:
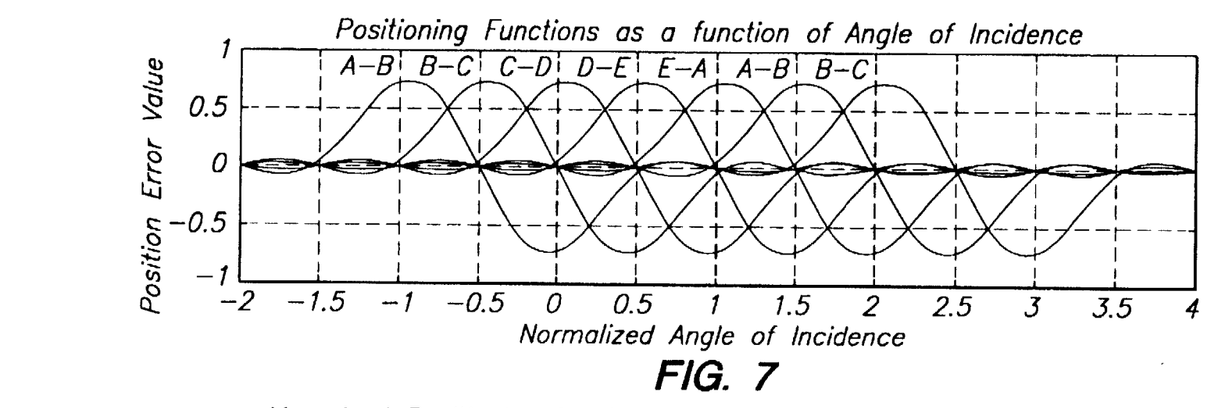
FIG. 7 is a plot of difference of position functions of FIG. 6 as a function of angle of incidence.

Next, as represented by step 500, data pages are recorded in the same image space of the crystal 38 in the conventional manner, as described above in recording the servo blocks. In the preferred embodiment, each data page is recorded at reference angle increments of θ, starting at 0. Accordingly, FIG. 5 presents the intensity of three recorded data pages, D1, D2, and D3, as a function of the angle of incidence. Examining FIGS. 5 and 6, concurrently, shows that servo block spots B and C provide nominal position feedback information for data page D1, servo block spots D and E provide nominal position feedback information for data page D2 and servo block spots A and B provide nominal position feedback information for data page D3. For example, at θ=0, spots B and C are equally intensified at approx. 0.8 of normalized power while spots A and D are equally intensified at approx. 0.1 of normalized power, which is represented by servo pattern B-C of FIG. 4b. The relationship of adjacent servo patterns is best illustrated by FIG. 7, which shows the difference of positioning functions as a function of angle of incidence. Function A-B represents the difference in sinc functions of spots A and B, function B-C represents the difference of sinc functions of spots B and C, and so forth. Thus, A-B represents the intensity of servo block A-B as a function of angle of incidence.

Figure 8:
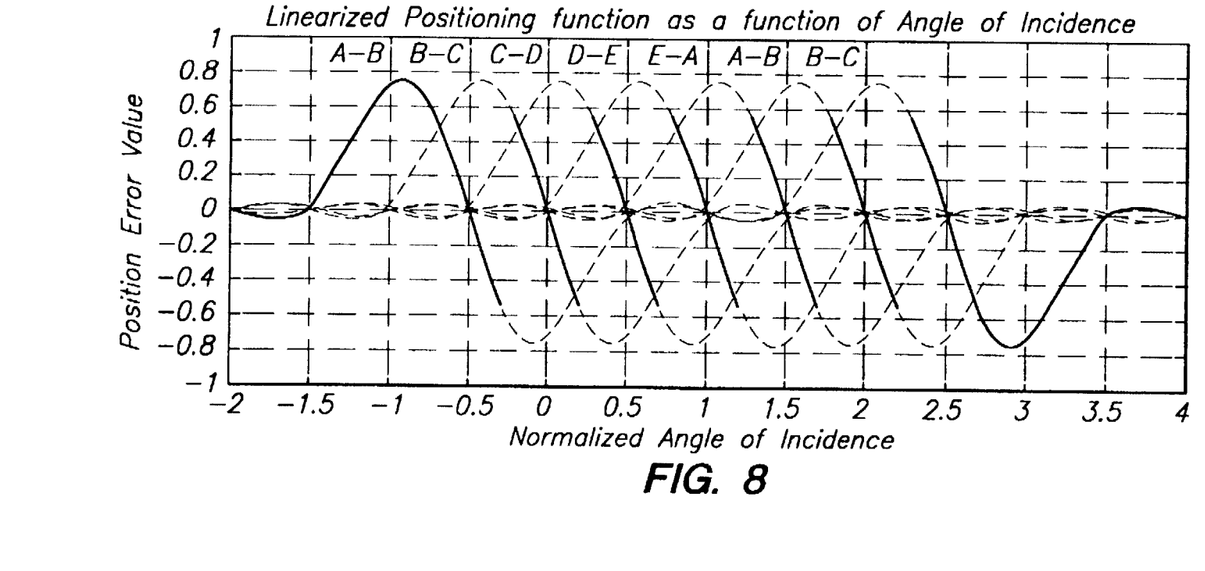
FIG. 8 is a plot of linearized positioning function as a function of angle of incidence of the reference beam.

As illustrated in FIGS. 7 and 8, several positioning functions exist at each "data page center", i.e. reference angle at which a data page exhibits its highest intensity. However, the most linear positioning function at each data page center would provide the most reliable position feedback information for that data page. Hence, FIG. 8 represents a linearized positioning function as a function of the angle of incidence, θ. Accordingly, between −0.25θ and 0.25θ, servo pattern B-C provide feedback information for data page D1, between 0.75θ and 1.25θ, servo patterns D-E provide position feedback for data page D2, and so forth. By utilizing the linearized portions of each positioning function, the present invention enables data pages to be tracked in an accurate manner. Note that in the present embodiment, servo blocks are recorded at 0.5θ increments, resulting in a range of linearized positioning function of 0.5θ. Those skilled in the art will realize that servo blocks may be recorded at other increments and still retrieve data pages with maximum SNR. However, with increments less than 0.5θ, the range of linearized positioning function is reduced (see FIG. 8). In addition, with increments greater than 0.5θ, the range is increased but may include non-linear portions.

It should also be pointed out that the reference angle $\theta_r$ has two degrees of freedom i.e. $\theta_r$ may be indexed in the x direction as well as in the y direction, with each increment in each direction corresponding to a different hologram within the same image space. Therefore, as discussed herein above, servo block patterns corresponding to reference angles indexed in the y direction may be recorded along the vertical edges of the periphery of an image space, illustrated in FIG. 3. Once the minimum angular spacing θ is determined, the write process may begin, and the order in which the servo blocks are written is not constrained. The important characteristics are that adjacent servo blocks are exposed at nearly the same efficiency and are accurately spaced apart at 0.5θ increments.

In one improvement over the system 10 shown in FIG. 1, the present invention incorporates the position feedback information as described above to fine tune the reference angle and maximize SNR of the recorded signal by reducing crosstalk.

In reconstructing a data page, (represented by step 600), a reference beam illuminates the crystal at a specific reference angle. Depending on the reference angle, partial images of the data page and servo patterns may be generated on the detector array 39. For example, propagating a reference beam at the crystal at an angle of incidence of 0.75θ would reconstruct partial images of data pages recorded at reference angles 0 and θ (indicated by FIG. 5) indicating crosstalk, as well as position feedback information in the form of servo patterns 3, 4, and 5, (indicated by FIG. 6). According to FIG. 8, either positioning function 3–4 or 4–5 may be utilized to retrieve data page D1 or D2, respectively. As position feedback information is transmitted to a voice coil motor (VCM) 41, the VCM rotates reflecting mirror 33 to adjust the reference angle. As a result, SNR is maximized and crosstalk is minimized as the reconstructed data page achieves maximum diffraction efficiency and intensity. Alternatively, a reference beam illuminating the crystal at an angle of incidence of 1.0θ would reconstruct data page D2, with maximum SNR and minimum crosstalk (as indicated by FIG. 5), as well as servo patterns 1, 3, 4, and 5. As illustrated in FIG. 9, servo patterns 1 and 3 would exhibit equal intensity, as would servo patterns 4 and 5.

Those skilled in the art will also understand that other means may be applicable for adjusting the angle of incidence of the reference beam, in response to position feedback information. For example, the crystal may be rotated by a voice coil motor or a stepper motor to adjust the angle of incidence.

In accordance with principles of the present invention, servo blocks may also be applicable to wavelength multiplexing. The application being similar to that described herein above with respect to angular multiplexing. Specifically, once a minimum wavelength spacing is determined servo blocks may be recorded at ω/2 intervals while data pages would be recorded at intervals of to. The details of determining the minimum wavelength spacing is well known to those skilled in the art. For example the Hong et al. article entitled "Volume Holographic Memory Systems: Techniques and Architectures" discloses minimum frequency spacing as $|2\pi \Delta v/(c/n)|(1+\cos\theta_r)$ where v=optical frequency, $\theta_r$=reference angle, and n=refractive index of the crystal. Additionally, separate servo blocks must be recorded for each type of multiplexing, i.e. angular and wavelength multiplexing. Both angular and wavelength multiplexing techniques may be used separately or in combination.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A method of holographic recording in a photorefractive medium comprising the steps of:

recording a plurality of servo patterns within an image space in the medium;

recording a plurality of data pages within the image space in the medium; and providing a closed loop position feedback system for reconstructing the data pages, wherein each servo pattern provides continuous position feedback information and each pattern is generated by illuminating the medium with a servo reference beam and a servo object beam, each servo reference beam and servo object beam being incident upon a face of the medium at a servo reference angle, the servo reference angle defining the angle between the servo reference beam and the servo object beam and being approximately half of a minimum angular spacing of the medium.

2. The method of claim 1 wherein each of the data pages is generated by illuminating the medium with a data page reference beam and a data page object beam, each data page reference beam and data page object beam being incident upon the face of the medium at a data page reference angle, the data page reference beam defining the angle between the data page reference beam and the data page object beam.

3. The method of claim 1 further comprising the step of converting the plurality of servo patterns into a plurality of permanent holograms that cannot be erased by subsequent illumination of the medium.

4. The method of claim 3 wherein the step of converting the plurality of servo patterns further comprises the step of heating the medium.

5. The method of claim 1 wherein the plurality of servo patterns provide means for reconstructing one of the data pages with substantially no crosstalk from other data pages.

6. The method of claim 1 wherein each of the servo patterns is located around the periphery of the image space in the medium.

7. The method of claim 1 wherein the servo block object beam and the servo block reference beam are generated with a coherent monochromatic light source.

8. The method of claim 2 wherein the data page object beam and the data page reference beam are generated with the coherent monochromatic light source.

9. The method of claim 1 further comprising the step of recording an image space identifier within each of a plurality of image spaces in the medium, each identifier providing means for distinguishing each of the image spaces.

10. A method of holographic recording in a photorefractive medium comprising the steps of:

recording a first servo pattern in the medium, the first servo pattern being defined by a first interference grating, the first grating being generated by illuminating the medium with a first reference beam and a first object beam to effect the migration of charges in the medium, the first servo block reference beam and the first servo block object beam being incident upon a face of the medium at a first servo block reference angle, the first servo block reference angle defining the angle between the first servo block reference beam and the first servo block object beam;

recording a second servo pattern in the medium, the second servo pattern being defined by a second interference grating, the second grating being generated by illuminating the medium with a second reference beam and a second object beam to effect the migration of charges in the medium, the second servo pattern reference beam and the second servo pattern object beam being incident upon the face of the medium at a second servo pattern reference angle, the second servo pattern reference angle defining the angle between the second servo pattern reference beam and the second servo pattern object beam;

recording a third servo pattern in the medium, the third servo pattern being defined by a third interference grating, the third grating being generated by illuminating the medium with a third reference beam and a third object beam to effect the migration of charges in the medium, the third servo pattern reference beam and the third servo pattern object beam being incident upon the face of the medium at a third servo pattern reference angle, the third servo pattern reference angle defining the angle between the third servo pattern reference beam and the third servo pattern object beam;

recording a fourth servo pattern in the medium, the fourth servo pattern being defined by a fourth interference grating, the fourth grating being generated by illuminating the medium with a fourth reference beam and a fourth object beam to effect the migration of charges in the medium, the fourth servo pattern reference beam and the fourth servo pattern object beam being incident upon the face of the medium at a fourth servo pattern reference angle, the fourth servo pattern reference angle defining the angle between the fourth servo pattern reference beam and the fourth servo pattern object beam;

recording a fifth servo pattern in the medium, the fifth servo pattern being defined by a fifth interference grating, the fifth servo pattern being generated by illuminating the medium with the fifth reference beam and the fifth object beam to effect the migration of charges in the medium, the fifth servo pattern reference beam and the fifth servo pattern object beam being incident upon the face of the medium at a fifth servo pattern reference angle, the fifth servo pattern reference angle defining the angle between the fifth servo pattern reference beam and the fifth servo pattern object beam;

recording a first data page in the medium, the first data page being defined by a first data page interference grating, the first data page grating being generated by illuminating the medium with a first data page reference beam and a first data page object beam to effect the migration of charges in the medium, the first data page reference beam and the first data page object beam being incident upon the face of the medium at a first data page reference angle, the first servo pattern reference angle defining the angle between the first data page reference beam and the first data page object beam;

recording a second data page in the medium, the second data page being defined by a second data page interference grating, the second data page grating being generated by illuminating the medium with a second data page reference beam and a second data page object beam to effect the migration of charges in the medium, the second data page reference beam and the second data page object beam being incident upon the face of the medium at a second data page reference angle, the second data page reference angle defining the angle between the second data page reference beam and the second data page object beam; and recording a third data page in the medium, the third data page being defined by a third data page interference grating, the third data page grating being generated by illuminating the medium with a third data page reference beam and a third data page object beam to effect the migration of charges in the medium, the third data page reference beam and the third data page object beam being incident upon the face of the medium at a third data page reference angle, the third data page reference angle defining the angle between the third data page reference beam and the third data page object beam, wherein adjacent servo patterns are recorded at angular increments of approximately one-half of a minimum angular spacing of the medium.

11. The method of claim 10 further comprising the step of converting each of the servo patterns into holograms that cannot be erased by subsequent illumination.

12. The method of claim 10 wherein the second and third servo patterns provide continuous closed loop position feedback information during reconstruction of the first data page.

13. The method of claim 10 wherein the fourth and fifth servo pattern provide continuous closed loop position feedback information during reconstruction of the second data page.

14. The method of claim 10 wherein each of the servo patterns is defined by one of five patterns.

15. The method of claim 14 wherein each of the five patterns is recorded about a periphery of the image space.

16. The method of claim 14 wherein each of the five patterns is defined by a five spot arrangement.

17. The method of claim 10 wherein the reference beams, object beams, data page reference beams and data page object beams are each propagated with a same wavelength.

18. The method of claim 10 wherein adjacent data pages are recorded at an angular spacing of a minimum angular spacing of the medium.

19. A method for retrieving holograms recorded within an image space in a photorefractive medium comprising the steps of:

recording position feedback information within the image space in the medium, the position feedback information being defined by a plurality of patterns, each pattern being generated by illuminating the medium with a servo reference beam and a servo object beam, each servo reference beam and servo object beam being incident upon a face of the medium a servo block reference angle, the servo reference angle defining the angle between the servo reference beam and the servo object beam;

converting each of the plurality of patterns into permanent spatially varying index of refraction patterns in the medium that cannot be erased by subsequent illumination;

recording a plurality of data pages within the image space in the medium, each of the data pages being defined by illuminating the medium with a data page reference beam and a data page object beam to effect the migration of charges in the medium, each data page reference beam and data page object beam being incident upon the face of the medium at a data page reference angle, the data page reference beam defining the angle between the data page reference beam and the data page object beam;

reconstructing one of the data pages and position feedback information on a detector array by propagating the data page reference beam at the face of the medium at a reference angle; and adjusting the data page reference angle in response to the position feedback information.

20. The method of claim 19 wherein a servo block reference angle defined between each servo reference beam and each servo object beam remains fixed.

21. The method of claim 19 wherein a data page reference angle defined between each data page reference beam and each data page object beam remains fixed.

22. A method for retrieving holograms recorded within a plurality of image spaces in a photorefractive medium comprising the steps of:

recording a plurality of patterns within the image spaces in the medium, each pattern containing position feedback information being defined by a servo reference beam and a servo object beam, each servo reference beam and servo object beam being incident upon a face of the medium at a servo reference angle, the servo reference angle defining the angle between the servo reference beam and the servo object beam;

converting each of the plurality of patterns into permanent spatially varying index of refraction patterns in the medium that cannot be erased by subsequent illumination;

recording an image space identifier within each of the image spaces, each identifier providing means for distinguishing each of the image spaces;

recording a plurality of data pages within the image spaces in the medium, each of the data pages being defined by a data page reference beam and a data page object beam, each data page reference beam and data page object beam being incident upon the face of the medium at a data page reference angle, the data page reference beam defining the angle between the data page reference beam and the data page object beam;

reconstructing a desired data page and position feedback information from an image space, on a detector array, by propagating the data page reference beam at the face of the medium at a reference angle; and continuously adjusting the reference angle in response to the position feedback information until the desired data page is reconstructed with a minimum crosstalk.

23. The method of claim 2 wherein the reconstructing of data pages comprises the step of projecting a desired reference beam at the medium at a reference angle.

24. The method of claim 23 wherein the closed loop position feedback system continuously adjusts the reference angle, in response to position feedback information, until a desired data page is reconstructed with a minimum crosstalk.

* * * * *